US010635972B1

(12) United States Patent
Le et al.

(10) Patent No.: US 10,635,972 B1
(45) Date of Patent: Apr. 28, 2020

(54) RECURRENT NEURAL NETWORKS WITH RECTIFIED LINEAR UNITS

(71) Applicant: Google LLC, Mountain View, CA (US)

(72) Inventors: Quoc V. Le, Mountain View, CA (US); Geoffrey E. Hinton, Toronto (CA); Navdeep Jaitly, Mountain View, CA (US)

(73) Assignee: Google LLC, Mountain View, CA (US)

( * ) Notice: Subject to any disclaimer, the term of this patent is extended or adjusted under 35 U.S.C. 154(b) by 997 days.

(21) Appl. No.: 15/082,769

(22) Filed: Mar. 28, 2016

Related U.S. Application Data

(60) Provisional application No. 62/139,569, filed on Mar. 27, 2015.

(51) Int. Cl.
   *G06N 3/08* (2006.01)
   *G06N 3/063* (2006.01)

(52) U.S. Cl.
   CPC .............. *G06N 3/08* (2013.01); *G06N 3/063* (2013.01)

(58) Field of Classification Search
   None
   See application file for complete search history.

(56) References Cited

PUBLICATIONS

Mao, Junhua, Wei Xu, Yi Yang, Jiang Wang, Zhiheng Huang, and Alan Yuille. "Deep captioning with multimodal recurrent neural networks (m-rnn)." arXiv preprint arXiv:1412.6632(2014). (Year: 2014).*

Sønderby, Søren Kaae, and Ole Winther. "Protein secondary structure prediction with long short term memory networks." arXiv preprint arXiv:1412.7828 (2014). (Year: 2014).*

Glorot, Xavier, Antoine Bordes, and Yoshua Bengio. "Deep sparse rectifier neural networks." In Proceedings of the fourteenth international conference on artificial intelligence and statistics, pp. 315-323. 2011. (Year: 2011).*

Salinas, Emilio, and Laurence F. Abbott. "A model of multiplicative neural responses in parietal cortex." Proceedings of the national academy of sciences 93, No. 21 (1996): 11956-11961. (Year: 1996).*

Hahnloser, Richard LT. "On the piecewise analysis of networks of linear threshold neurons." Neural Networks 11, No. 4 (1998): 691-697. (Year: 1998).*

(Continued)

*Primary Examiner* — Alexey Shmatov
*Assistant Examiner* — Casey R. Garner
(74) *Attorney, Agent, or Firm* — Fish & Richardson P.C.

(57) ABSTRACT

Methods and systems for learning long-term dependencies in recurrent neural networks. In one aspect, a neural network system is configured to receive a respective input for each of a plurality of time steps and to generate a respective output for each time step, the neural network system comprising one or more recurrent neural network layers, wherein, for each of the time steps, each of the recurrent neural network layers is configured to receive a layer input for the time step; apply an input weight matrix to the layer input to generate a first output; apply a recurrent weight matrix to a hidden state of the recurrent neural network layer for the time step to generate a second output; combine the first and second outputs to generate a combined output; and apply a rectified linear unit activation function to the combined output to generate a layer output for the time step.

20 Claims, 4 Drawing Sheets

(56) References Cited

PUBLICATIONS

Jain, Arjun, Jonathan Tompson, Mykhaylo Andriluka, Graham W. Taylor, and Christoph Bregler. "Learning human pose estimation features with convolutional networks." arXiv preprint arXiv:1312.7302 (2013). (Year: 2013).*

Mikolov et al., "Learning Longer Memory in Recurrent Neural Networks," arXiv preprint arXiv:1412.7753v2 [cs.NE], Apr. 2015, pp. 1-9.

Nair and Hinton, "Rectified Linear Units improve Restricted Boltzmann Machines," In International Conference on Machine Learning, , 8 pages, 2010.

Pascanu et al., "On the difficulty of training recurrent neural networks," arXiv preprint arXiv:1211.5063, 2012.

Rumelhart et al., "Learning representations by back-propagating errors," Nature, 323(6088):533-536, Oct. 1986.

Saxe et al., "Exact solutions to the nonlinear dynamics of learning in deep linear neural networks," arXiv preprint arXiv:1312.6120, pp. 1-22, Dec. 2013.

Socher et al., "Parsing with compositional vector grammars," In ACL, pp. 455-465, Jun. 2013.

Sutskever et al., "Generating text with recurrent neural networks," Proceedings of the 28th International Conference on Machine Learning, pp. 1017-1024, 2011.

Zeiler et al., "On rectified linear units for speech processing," In IEEE Conference on Acoustics, Speech and Signal Processing (ICASSP), 5 pages, 2013.

* cited by examiner

RECURRENT NEURAL NETWORKS WITH RECTIFIED LINEAR UNITS

CROSS REFERENCE TO RELATED APPLICATIONS

This application is a non-provisional of and claims priority to U.S. Provisional Patent Application No. 62/139,569, filed on Mar. 27, 2015, the entire contents of which are hereby incorporated by reference.

BACKGROUND

This specification relates to processing inputs through the layers of recurrent neural networks to generate outputs.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

Some neural networks are recurrent neural networks. A recurrent neural network is a neural network that receives an input sequence and generates an output sequence from the input sequence. In particular, a recurrent neural network can use some or all of the internal state of the network from a previous time step in computing an output at a current time step.

SUMMARY

In general, one innovative aspect of the subject matter described in this specification can be embodied in methods for training a recurrent neural network comprising one or more recurrent neural network layers on a set of training sequences, each training sequence comprising a respective input at each of a plurality of time steps, and each recurrent neural network layer having a rectified linear unit activation function, the method comprising initializing the recurrent neural network, wherein initializing the recurrent neural network comprises setting a respective recurrent weight matrix for each of the recurrent neural network layers to a diagonal matrix having positive values along the diagonal, wherein each of the recurrent neural network layers is configured to, for each of the training sequences and for each of the plurality of time steps: receive a layer input for the time step; apply a current input weight matrix to the layer input to generate a first output; apply a current recurrent weight matrix to a hidden state of the recurrent neural network layer for the time step to generate a second output; combine the first and second outputs to generate a combined output for the time step; and apply the rectified linear unit activation function to the combined output to generate a layer output for the time step; and after initializing the recurrent neural network, training the recurrent neural network on the set of training sequences to adjust the recurrent weight matrices and the input weight matrices of the recurrent neural network layers.

Another innovative aspect of the subject matter described in this specification can be embodied in methods for processing a respective neural network input for each of a plurality of time steps using a recurrent neural network to generate a respective neural network output for each of the plurality of time steps, the recurrent neural network comprising one or more recurrent neural network layers and an output layer, the method comprising, for each of the plurality of time steps: processing the neural network input for the time step using the one or more recurrent neural network layers to generate an initial output for the time step, wherein, for each of the time steps, each of the recurrent neural network layers is configured to perform operations comprising: receiving a layer input for the time step; applying an input weight matrix to the layer input to generate a first output; applying a recurrent weight matrix to a hidden state of the recurrent neural network layer for the time step to generate a second output; combining the first and second outputs to generate a combined output for the time step; and applying a rectified linear unit activation function to the combined output to generate a layer output for the time step.

Other embodiments of this aspect include corresponding computer systems, apparatus, and computer programs recorded on one or more computer storage devices, each configured to perform the actions of the methods. A system of one or more computers can be configured to perform particular operations or actions by virtue of software, firmware, hardware, or any combination thereof installed on the system that in operation may cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. In some implementations training the recurrent neural network comprises training the recurrent neural network using a backpropagation through time training process.

In some implementations the positive values along the diagonal of the recurrent weight matrix are the same.

In some cases the positive values along the diagonal of the recurrent weight matrix are one.

In some instances the positive values along the diagonal of the recurrent matrix are scaled using a scalar less than one.

In some implementations applying the rectified linear unit activation function comprises, for each element of the combined output, setting a value of a corresponding element of the layer output equal to a maximum of zero and a value of the element of the combined output.

In some cases initializing the recurrent neural network further comprises setting biases for each of the recurrent neural network layers to zero.

In some implementations each of the recurrent neural network layers is further configured to, for each of the training sequences and for each of the plurality of time steps, update the hidden state of the recurrent neural network layer for a next time step using the layer output for the time step.

In some implementations the method further comprises updating the hidden state of the recurrent neural network layer for a next time step using the layer output for the time step.

In some cases the method further comprises, for each of the time steps: processing the initial output for the time step using the output layer to generate the neural network output for the time step.

In some implementations combining the first and second outputs to generate a combined output for the time step comprises adding the first output to the second output to generate a combined output for the time step.

The subject matter described in this specification can be implemented in particular embodiments so as to realize one or more of the following advantages.

A recurrent neural network system composed of rectified linear units that implements the proposed initialization scheme overcomes the well-known difficulty of learning long term dependencies in recurrent neural networks due to vanishing and exploding gradients. In particular, the initialization scheme ensures that when error derivatives for the hidden units of the system are back propagated through time they remain constant, provided that no extra error derivatives are added. Compared to other recurrent neural network systems that are not composed of rectified linear units, i.e., that do not use rectified linear units as the activation function for recurrent layers, such as Long Short-Term Memory (LSTM) systems, the neural network system composed of rectified linear units that implements the proposed initialization scheme does not require complex and costly optimization techniques and network architectures, and is computationally simpler to implement.

A recurrent neural network system composed of rectified linear units may be efficiently trained for a variety of classification tasks and may achieve high levels of accuracy when modeling long-range dependencies, e.g., in very long-range temporal structures or predicting the next word in a very large corpus of text. A recurrent neural network system composed of rectified linear units may further be effectively trained and applied to tasks that exhibit less long-range dependencies.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes a system and methods for learning long term dependencies in recurrent neural networks composed of rectified linear units, i.e., recurrent neural networks including recurrent neural network layers having rectified linear units as activation functions. During training of these recurrent neural networks, an identity matrix is used to initialize recurrent weight matrices and biases are set to zero. Each new hidden state vector is therefore obtained by copying the previous hidden vector then adding on the effect of the current inputs and replacing all negative states by zero.

Figure 1:
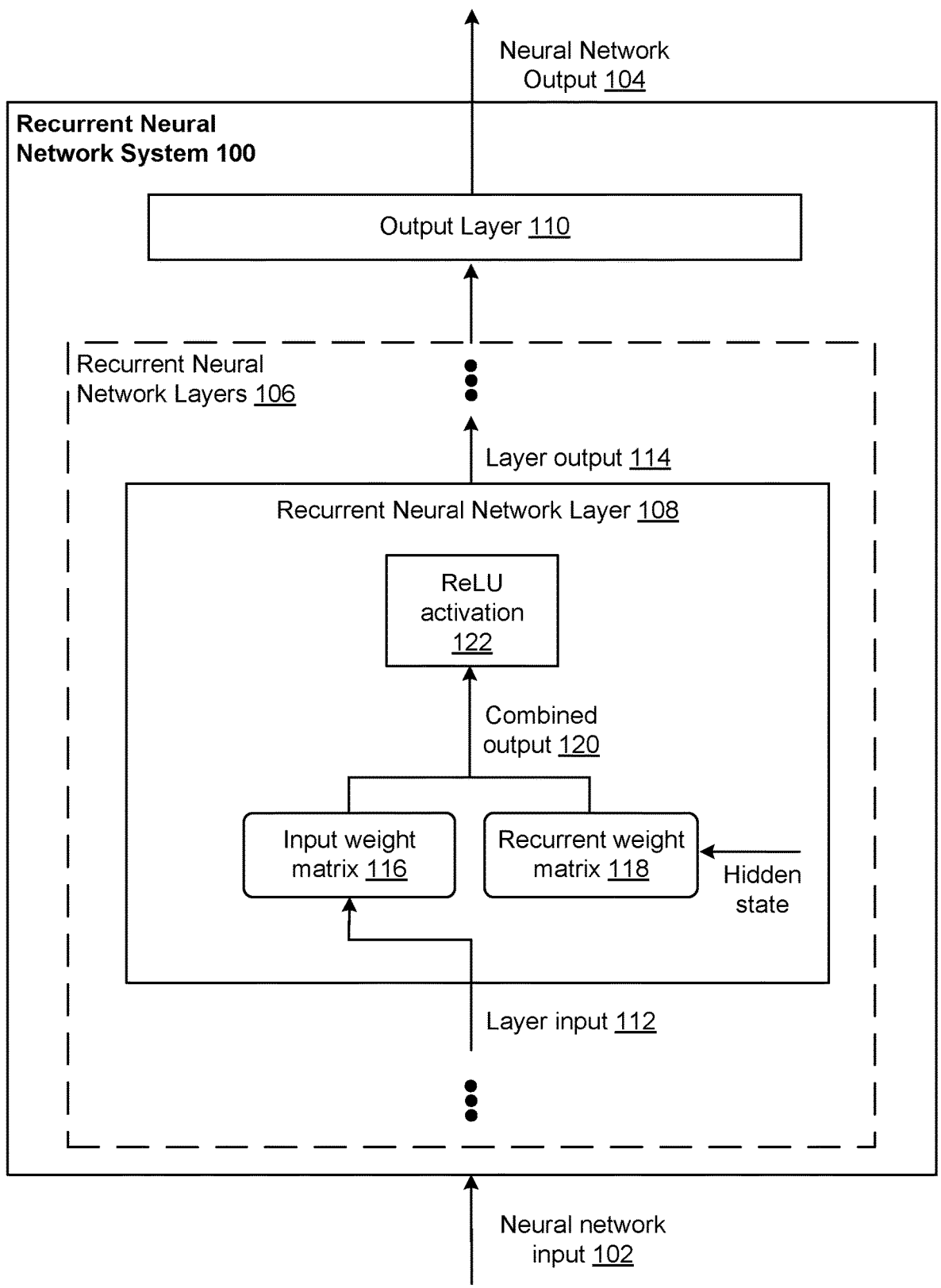
FIG. 1 is an example recurrent neural network system.

FIG. 1 shows an example recurrent neural network system 100. The recurrent neural network system 100 is an example of a system implemented as computer programs on one or more computers in one or more locations, in which the systems, components, and techniques described below can be implemented.

The recurrent neural network system 100 is a machine learning system that receives system inputs, e.g., neural network input 102, and generates system outputs, e.g., neural network output 104.

The recurrent neural network system 100 can be configured to receive any kind of sequences of inputs and to generate any kind of score or classification output based on the input. For example, if the inputs to the recurrent neural network system 100 are a sequence of pixels from an image, e.g., an MNIST image, the output generated by the recurrent neural network system 100 may be scores for each of a set of object categories, with each score representing an estimated likelihood that the image contains an image of an object belonging to the category. In other examples the inputs to the recurrent neural network system 100 may be a sequence of graphemes, e.g., in language modeling settings, or a sequence of phonemes, e.g., in speech recognition settings.

The recurrent neural network system 100 includes one or more recurrent neural network layers 106, e.g., recurrent neural network layer 108, and an output layer, e.g., output layer 110. A recurrent neural network layer is a neural network layer that uses an internal memory to process sequences of inputs. Although only a single recurrent neural network layer 108 is shown in FIG. 1 for clarity, in some implementations the recurrent neural network system includes multiple recurrent neural network layers. An example recurrent neural network that can be used for language modeling is described in more detail in "Generating text with recurrent neural networks," I. Sutskever, J. Martens, and G. E. Hinton, *In Proceedings of the 28th International Conference on Machine Learning*, pages 1017-1024, 2011.

The recurrent neural network layers 106 collectively process neural network inputs received by the recurrent neural network system 100 to generate a respective neural network output for each received neural network input. For example, at each time step, each of the layers of the recurrent neural network system 100 is configured to receive a respective layer input for the time step and process the layer input to generate a respective layer output from the input. For example, recurrent neural network layer 108 is configured to receive layer input 112 and process the layer input 112 to generate layer output 114. Output layer 110 is configured to receive a layer output generated by one or more of the recurrent neural network layers 106 for the time step and process the received layer output to generate a neural network output for the time step.

Some or all of the layers of the recurrent neural network 106 are associated with one or more respective parameter matrices, i.e., weight matrices, that store current values of the parameters of the layer. In some implementations some or all of the layers of the recurrent neural network 106 are further associated with one or more layer biases.

The recurrent neural network layers 106 generate outputs from inputs in accordance with the current values of the parameters and biases for the neural network layer, e.g., by multiplying a received input by a respective weight matrix of current parameter values as part of generating an output from the received input. For example, recurrent neural network layer 108 can generate layer output 114 by first applying a current input weight matrix, e.g., input weight matrix 116, to the layer input 112 to generate a first output and by applying a current recurrent weight matrix, e.g., recurrent weight matrix 118, to a hidden state of the recurrent neural network layer for the time step to generate a second output. In some implementations recurrent neural network layer 108 may further add respective biases to the first and second outputs. The recurrent neural network layer 108 may combine the generated first and second outputs, e.g., by adding the first output to the second output, to generate a combined output for the time step, e.g., combined output 120, and apply a rectified linear unit activation function, e.g., rectified linear unit activation 122, to the combined output to generate layer output 114 for the time step. In some implementations each recurrent neural network layer applies a rectified linear unit activation function by, for each element of the combined output, setting a value of a corresponding element of the layer output equal to a maximum of zero and a value of the element of the combined output.

Each of the recurrent neural network layers 106 included in the recurrent neural network system 100 may be further configured to update the hidden state of the recurrent neural network layer for a next time step using the layer output for the time step. In some implementations, the system sets the updated hidden state to be the layer output for the time step, i.e., uses the layer output for the current time step as the hidden state for the next time step The recurrent neural network system 100 can be trained on a set of training sequences in order to determine trained values of the parameters and biases of the neural network layers, i.e., to adjust the values of the parameters and biases from initial values to trained values. Setting initial values for the neural network layer parameters to initialize the recurrent neural network system is described in more detail below with reference to FIG. 2.

During the training, the recurrent neural network system 100 can process a batch of training sequences and generate a respective neural network output for each training sequence in the batch. The neural network outputs can then be used to adjust the values of the parameters of the components of the recurrent neural network system 100, e.g., to adjust the respective recurrent weight matrices and input weight matrices of the recurrent neural network layers. In some implementations the system may apply a backpropagation through time training process. Training the neural network layers is described in more detail below with reference to FIG. 2.

Once the recurrent neural network system 100 has been trained, the system may receive a new neural network input for processing and process the neural network input through the neural network layers to generate a new neural network output for the input in accordance with the trained values of the parameters of the components of the recurrent neural network system 100. Processing a neural network input for each of a plurality of time steps using a recurrent neural network is described in more detail below with reference to FIGS. 3A and 3B.

Figure 2:
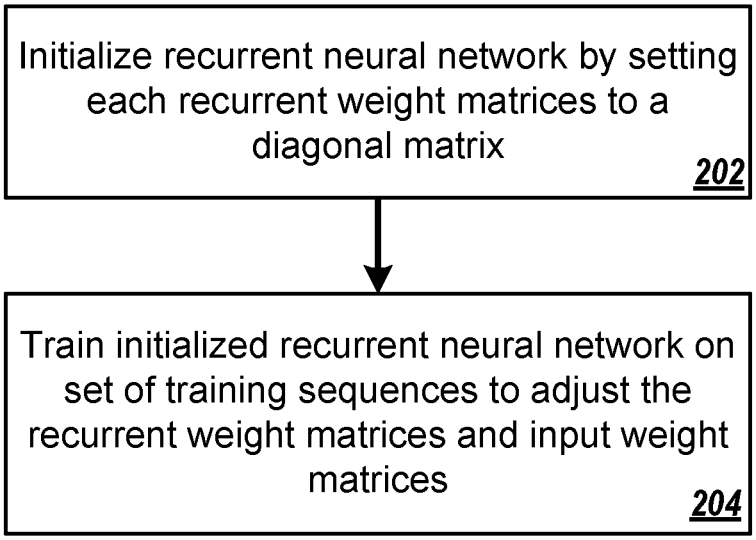
FIG. 2 is a flow diagram of an example process for training a recurrent neural network to process a neural network input.

FIG. 2 is a flow diagram of an example process 200 for training a recurrent neural network to process a neural network input. For convenience, the process 200 will be described as being performed by a system of one or more computers located in one or more locations. For example, a recurrent neural network including one or more recurrent neural network layers that each have a rectified linear unit activation function, e.g., the recurrent neural network system 100 of FIG. 1, appropriately programmed in accordance with this specification, can perform the process 200.

The system initializes the recurrent neural network by setting a respective recurrent weight matrix for each of the recurrent neural network layers in the recurrent neural network system to a diagonal matrix (step 202). Each diagonal matrix has positive values along the diagonal. In some implementations the positive values along the diagonal of the recurrent weight matrix are the same. For example, in some implementations the positive values along the diagonal of the recurrent weight matrix are equal to one, i.e., the recurrent weight matrix equals the identity matrix. In some implementations, such as in classification tasks that exhibit less long-range dependencies, the identity matrix may be scaled by a small scalar, e.g., a scalar whose value is less than one.

In some implementations initializing the recurrent neural network further includes setting respective biases for each of the recurrent neural network layers to zero. By setting a respective weight matrix for each of the recurrent neural network layers in the recurrent neural network system to a diagonal matrix and setting the bias to zero, each new hidden state vector of the recurrent neural network layer may be obtained by copying the previous hidden state vector then adding on the effect of the current inputs and replacing all negative states by zero.

After initializing the recurrent neural network, the system trains the recurrent neural network (step 204). The system trains the recurrent neural network on a set of training sequences to adjust the recurrent weight matrices and input weight matrices of the recurrent neural network layers. Each training sequence in the set of training sequences includes a respective input at each of multiple time steps. In some implementations the system trains the recurrent neural network using a backpropagation through time training process. An example of a backpropagation through time training process for training the recurrent neural network is described in R. Pascanu, T. Mikolov, and Y. Bengio. *On the difficulty of training recurrent neural networks*. arXiv preprint arXiv: 1211.5063, 2012.

Figure 3A:
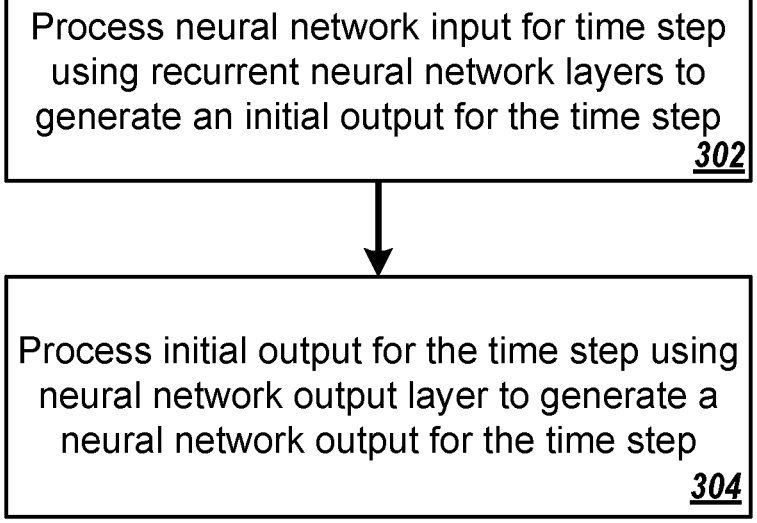
FIG. 3A is a flow diagram of an example process for processing a neural network input for each of multiple time steps.

FIG. 3A is a flow diagram of an example process 300 for processing a neural network input for each of multiple time steps to generate a respective neural network output for each of the multiple time steps. For convenience, the process 400 will be described as being performed by a system of one or more computers located in one or more locations. For example, a recurrent neural network system including one or more recurrent neural network layers and an output layer, e.g., the recurrent neural network system 100 of FIG. 1, appropriately programmed in accordance with this specification, can perform the process 200.

For each time step, the system processes the neural network input for the time step using the one or more recurrent neural network layers to generate an initial output for the time step (step 302).

For each time step, the system processes the generated initial output for the time step using the output layer to generate the neural network output for the time step (step 304).

Figure 3B:
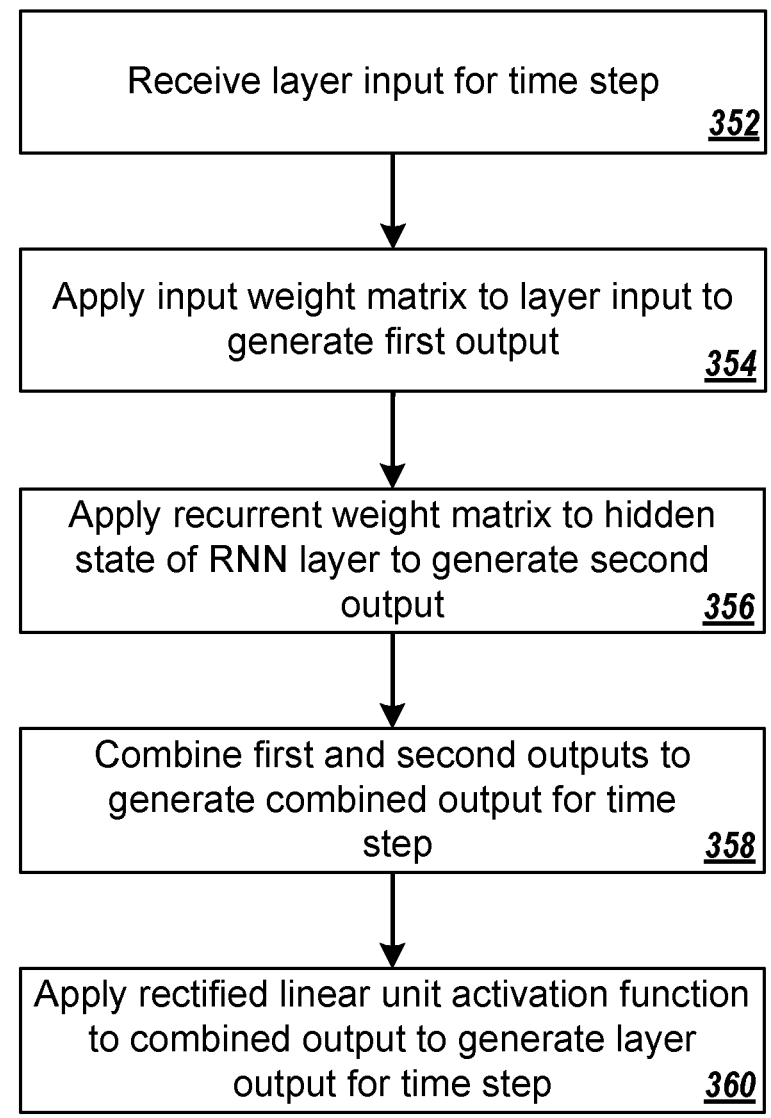
FIG. 3B is a flow diagram of an example process performed by a recurrent neural network layer for processing a neural network layer input at a given time step.

FIG. 3B is a flow diagram of an example process 350 performed by a recurrent neural network layer that has a rectified linear unit activation function for processing a neural network layer input at a given time step to generate a neural network layer output for the time step. For convenience, the process 350 will be described as being performed by a system of one or more computers located in one or more locations. For example, a recurrent neural network layer, e.g., recurrent neural network layer 110 with rectified linear unit activation function 122 of FIG. 1, appropriately programmed in accordance with this specification, can perform the process 350.

The system receives a layer input for the time step (step 352).

The system applies an input weight matrix to the layer input to generate a first output (step 354). For example, the input weight matrix may be a input weight matrix of trained values, as described above with reference to step 204 of FIG. 2.

The system applies a recurrent weight matrix to a hidden state of the recurrent neural network layer for the time step to generate a second output (step 356). For example, the recurrent weight matrix may be a recurrent weight matrix of trained values, as described above with reference to step 204 of FIG. 2.

The system combines the first and second outputs to generate a combined output for the time step (358). For example, the system may add the first output to the second output to generate the combined output for the time step.

The system applies the respective rectified linear unit activation function to the combined output to generate a layer output for the time step (step 360). In some implementations the system applies the rectified linear unit activation function by, for each element of the combined output, setting a value of a corresponding element of the layer output equal to a maximum of zero and a value of the element of the combined output.

In some implementations the system may further update the hidden state of the recurrent neural network layer for a next time step in the set of multiple time steps using the generated layer output for the time step.

The process 350 can be performed for a neural network layer input for which the desired output, i.e., the neural network layer output that should be generated by the system for the input, is not known. The system can also perform the process 350 on inputs in a set of training data, i.e., a set of inputs for which the output that should be predicted by the system is known, in order to train the system, i.e., to determine trained values for the parameters of the neural network layer and the other neural network layers. In particular, the process 350 can be performed repeatedly on inputs selected from a batch of training data as part of a machine learning training technique to train the neural network, as described above with reference to FIG. 2.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS)

receiver, or a portable storage device, e.g., a universal serial bus (USB) flash drive, to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method for training a recurrent neural network comprising one or more recurrent neural network layers on a set of training sequences, each training sequence comprising a respective input at each of a plurality of time steps, and each recurrent neural network layer having a rectified linear unit activation function, the method comprising:

initializing the recurrent neural network, wherein initializing the recurrent neural network comprises setting a respective recurrent weight matrix for each of the recurrent neural network layers to a diagonal matrix having positive values along the diagonal and zeros for all other values, wherein each of the recurrent neural network layers is configured to, for each of the training sequences and for each of the plurality of time steps:
receive a layer input for the time step;
apply a current input weight matrix to the layer input to generate a first output;
apply a current recurrent weight matrix to a hidden state of the recurrent neural network layer for the time step to generate a second output;
combine the first and second outputs to generate a combined output for the time step;
apply the rectified linear unit activation function to the combined output to generate a layer output for the time step; and
update the hidden state of the recurrent neural network layer for a next time step; and after initializing the recurrent neural network, training the recurrent neural network on the set of training sequences to adjust the recurrent weight matrices and the input weight matrices of the recurrent neural network layers.

2. The method of claim 1, wherein training the recurrent neural network comprises training the recurrent neural network using a backpropagation through time training process.

3. The method of claim 1, wherein the positive values along the diagonal of the recurrent weight matrix are the same.

4. The method of claim 3, wherein the positive values along the diagonal of the recurrent weight matrix are one.

5. The method of claim 4, wherein the positive values along the diagonal of the recurrent matrix are scaled using a scalar less than one.

6. The method of claim 1, wherein applying the rectified linear unit activation function comprises:
for each element of the combined output, setting a value of a corresponding element of the layer output equal to a maximum of zero and a value of the element of the combined output.

7. The method of claim 1, wherein initializing the recurrent neural network further comprises setting biases for each of the recurrent neural network layers to zero.

8. The method of claim 1, wherein updating the hidden state comprises:
updating the hidden state of the recurrent neural network layer for the next time step using the layer output for the time step.

9. The method of claim 1, wherein combining the first and second outputs to generate a combined output for the time step comprises adding the first output to the second output to generate a combined output for the time step.

10. A system comprising one or more computers and one or more storage devices storing instructions that when executed by the one or more computers cause the one or more computers to perform operations for training a recurrent neural network comprising one or more recurrent neural network layers on a set of training sequences, each training sequence comprising a respective input at each of a plurality of time steps, and each recurrent neural network layer having a rectified linear unit activation function, the operations comprising:
initializing the recurrent neural network, wherein initializing the recurrent neural network comprises setting a respective recurrent weight matrix for each of the recurrent neural network layers to a diagonal matrix having positive values along the diagonal and zeros for all other values, wherein each of the recurrent neural network layers is configured to, for each of the training sequences and for each of the plurality of time steps:
receive a layer input for the time step;
apply a current input weight matrix to the layer input to generate a first output;
apply a current recurrent weight matrix to a hidden state of the recurrent neural network layer for the time step to generate a second output;
combine the first and second outputs to generate a combined output for the time step;
apply the rectified linear unit activation function to the combined output to generate a layer output for the time step; and
update the hidden state of the recurrent neural network layer for a next time step; and
after initializing the recurrent neural network, training the recurrent neural network on the set of training sequences to adjust the recurrent weight matrices and the input weight matrices of the recurrent neural network layers.

11. The system of claim 10, wherein training the recurrent neural network comprises training the recurrent neural network using a backpropagation through time training process.

12. The system of claim 10, wherein the positive values along the diagonal of the recurrent weight matrix are the same.

13. The system of claim 12, wherein the positive values along the diagonal of the recurrent weight matrix are one.

14. The system of claim 12, wherein the positive values along the diagonal of the recurrent matrix are scaled using a scalar less than one.

15. The system of claim 11, wherein applying the rectified linear unit activation function comprises:
for each element of the combined output, setting a value of a corresponding element of the layer output equal to a maximum of zero and a value of the element of the combined output.

16. The system of claim 11, wherein initializing the recurrent neural network further comprises setting biases for each of the recurrent neural network layers to zero.

17. The system of claim 11, wherein updating the hidden state comprises:
updating the hidden state of the recurrent neural network layer for a next time step using the layer output for the time step.

18. The system of claim 11, wherein combining the first and second outputs to generate a combined output for the time step comprises adding the first output to the second output to generate a combined output for the time step.

19. One or more non-transitory computer-readable storage media storing instructions that when executed by one or more computers cause the one or more computers to perform operations for training a recurrent neural network comprising one or more recurrent neural network layers on a set of training sequences, each training sequence comprising a respective input at each of a plurality of time steps, and each recurrent neural network layer having a rectified linear unit activation function, the operations comprising:
initializing the recurrent neural network, wherein initializing the recurrent neural network comprises setting a respective recurrent weight matrix for each of the recurrent neural network layers to a diagonal matrix having positive values along the diagonal and zeros for all other values, wherein each of the recurrent neural network layers is configured to, for each of the training sequences and for each of the plurality of time steps:
receive a layer input for the time step;
apply a current input weight matrix to the layer input to generate a first output;
apply a current recurrent weight matrix to a hidden state of the recurrent neural network layer for the time step to generate a second output;
combine the first and second outputs to generate a combined output for the time step; and
apply the rectified linear unit activation function to the combined output to generate a layer output for the time step; and
updating the hidden state of the recurrent neural network layer for a next time step; and
after initializing the recurrent neural network, training the recurrent neural network on the set of training sequences to adjust the recurrent weight matrices and the input weight matrices of the recurrent neural network layers.

20. The computer-readable storage media of claim 19, wherein the positive values along the diagonal of the recurrent weight matrix are the same.

* * * * *

UNITED STATES PATENT AND TRADEMARK OFFICE
CERTIFICATE OF CORRECTION

| | | |
|---|---|---|
| PATENT NO. | : 10,635,972 B1 | Page 1 of 1 |
| APPLICATION NO. | : 15/082769 | |
| DATED | : April 28, 2020 | |
| INVENTOR(S) | : Le et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1044 days.

Signed and Sealed this
Thirteenth Day of December, 2022

Katherine Kelly Vidal
*Director of the United States Patent and Trademark Office*